United States Patent
Lee et al.

(10) Patent No.: US 10,717,892 B2
(45) Date of Patent: Jul. 21, 2020

(54) POLYMER-BASED SUPERABSORBENT COATING COMPOSITION AND USE THEREOF

(71) Applicant: LG ELECTRONICS INC., Seoul (KR)

(72) Inventors: Jin-kyun Lee, Incheon (KR); Yoonho Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 131 days.

(21) Appl. No.: 15/573,062

(22) PCT Filed: Feb. 22, 2016

(86) PCT No.: PCT/KR2016/001692
§ 371 (c)(1),
(2) Date: Nov. 9, 2017

(87) PCT Pub. No.: WO2016/182176
PCT Pub. Date: Nov. 17, 2016

(65) Prior Publication Data
US 2018/0142116 A1    May 24, 2018

(30) Foreign Application Priority Data
May 12, 2015    (KR) .......................... 10-2015-0066229

(51) Int. Cl.
*C09D 133/08*    (2006.01)
*C09D 7/40*    (2018.01)
(Continued)

(52) U.S. Cl.
CPC .............. *C09D 133/08* (2013.01); *C08F 8/12* (2013.01); *C08F 120/06* (2013.01); *C09D 5/00* (2013.01); *C09D 5/08* (2013.01); *C09D 7/40* (2018.01); *C09D 133/10* (2013.01); *C09D 133/14* (2013.01); *C08K 3/36* (2013.01); *C08K 5/0025* (2013.01); *C08K 5/06* (2013.01)

(58) Field of Classification Search
CPC .......... C09D 133/08; C09D 7/40; C09D 5/00; C09D 5/08; C09D 133/10; C09D 133/14; C08F 8/12; C08F 120/06; C08K 3/36; C08K 5/0025; C08K 5/06
USPC ....................................... 427/385.5
See application file for complete search history.

(56) References Cited

U.S. PATENT DOCUMENTS

2012/0135216 A1*  5/2012  Kwon ................... B82Y 30/00
                                                                428/220

FOREIGN PATENT DOCUMENTS

JP    2003-335864 A    11/2003
JP    2011-1452 A    1/2011
(Continued)

*Primary Examiner* — Ronald Grinsted
(74) *Attorney, Agent, or Firm* — Birch, Stewart, Kolasch & Birch, LLP

(57) ABSTRACT

The present invention relates to a polymer-based superabsorbent coating composition and a use thereof. The superabsorbent coating composition comprises: (i) an absorbent material; and (ii) a binder comprising a polymerizable absorbent polymer and a crosslinking agent, wherein the absorbent material contains at least one functional group for chemically binding to the binder, thereby chemically bonding to the binder, and the absorbent polymer and the crosslinking agent chemically bond together within the binder.

13 Claims, 4 Drawing Sheets

(51) Int. Cl.
*C09D 5/00* (2006.01)
*C09D 5/08* (2006.01)
*C08F 120/06* (2006.01)
*C08F 8/12* (2006.01)
*C09D 133/14* (2006.01)
*C09D 133/10* (2006.01)
*C08K 3/36* (2006.01)
*C08K 5/00* (2006.01)
*C08K 5/06* (2006.01)

(56) References Cited

FOREIGN PATENT DOCUMENTS

| | | |
|---|---|---|
| JP | 2014-168949 A | 9/2014 |
| KR | 10-2006-0093984 A | 8/2006 |
| KR | 10-2007-0085443 A | 8/2007 |
| KR | 10-2007-0104663 A | 10/2007 |
| KR | 10-2009-0015068 A | 2/2009 |
| KR | 10-2011-0032258 A | 3/2011 |
| KR | 10-2014-0143292 A | 12/2014 |

* cited by examiner

[FIG. 1]
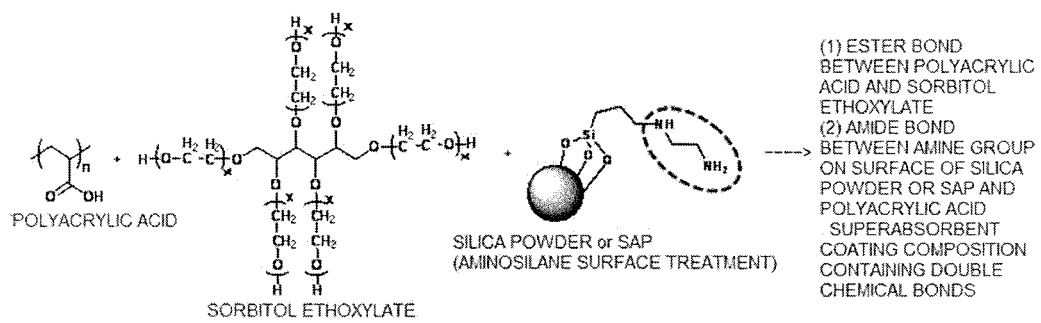

[FIG. 2]
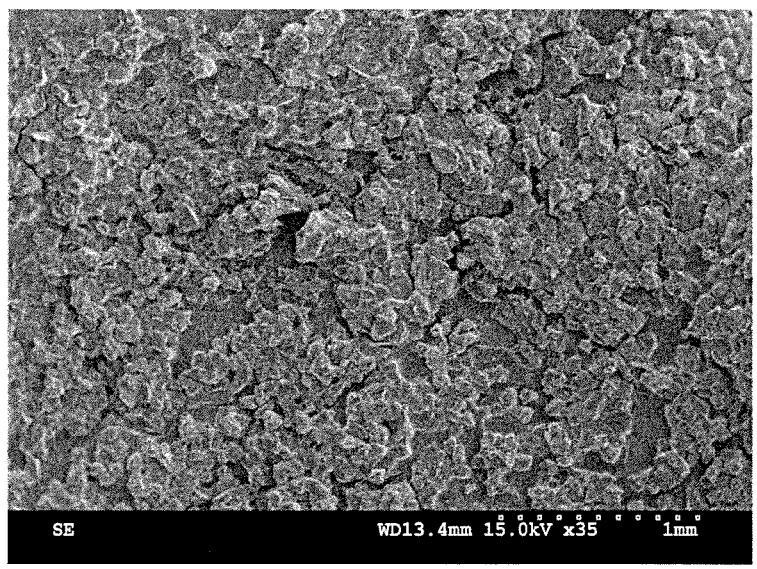

[FIG. 3]
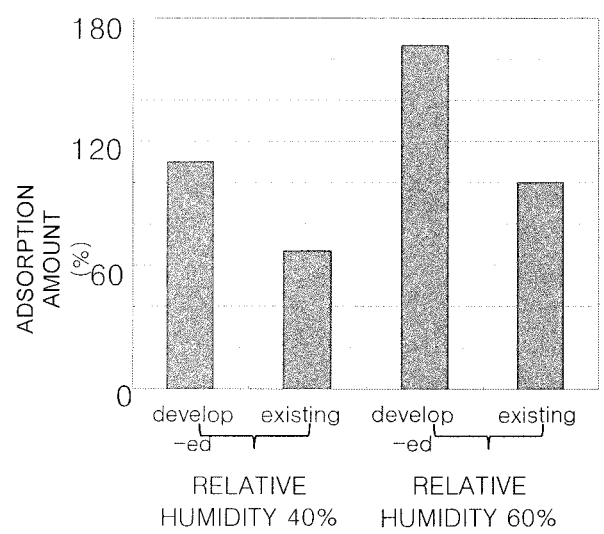

[FIG. 4]
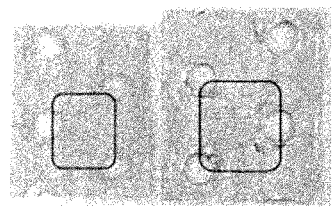

POLYMER-BASED SUPERABSORBENT COATING COMPOSITION AND USE THEREOF

CROSS-REFERENCE TO RELATED APPLICATIONS

This application is the National Stage filing under 35 U.S.C. 371 of International Application No. PCT/KR2016/001692, filed on Feb. 22, 2016, which claims the benefit of earlier filing date and right of priority to Korean Application No. 10-2015-0066229, filed on May 12, 2015, the contents of which are all hereby incorporated by reference herein in their entirety.

TECHNICAL FIELD

The present invention relates to a polymer-based superabsorbent coating composition and a coating method using the same, and the superabsorbent coating composition includes: (i) an absorbent material; and (ii) a binder comprising a polymerizable absorbent polymer and a crosslinking agent, in which the absorbent material is chemically bonded to the binder by having at least one functional group for being chemically bonded to the binder, and the polymerizable absorbent polymer and the crosslinking agent are chemically bonded to each other in the binder.

BACKGROUND ART

The damage caused by moisture penetrating the side just below the exposed surface of a product used in the outdoor environment, such as an air conditioner, is a well-known problem. The damage includes not only oxidative damage caused by water reacting with the surface of a material substrate used in the products, but also corrosion caused by water.

Products affected by the damage described above may be glass, carbon, fiber, a polymer or a reinforced material prepared by a mixture thereof, or a product containing the same. It is particularly a problem that water permeates the material or product, and thus may cause corrosion or chemical damage to an internal structure. In order to solve the problems associated with such damage, several strategies for providing waterproofing property to a product and preventing a sensitive internal surface from being brought into contact with water or water vapor present in the surrounding environment have been devised. Such a water-repellent technology includes surrounding the product with a protective material or sealing the surface thereof. That is, allowing a product to have waterproofing property by chemically manipulating the top surface of the product or applying a water-repellent coating onto the product.

A coating used in the traditional water repellency is composed of a material which is water-insoluble and does not allow the permeation of moisture, and thus is a physical barrier for blocking moisture. Such barrier coatings have included materials such as grease. However, specific defects are present in this type of coating. Grease is slippery and difficult to handle, and gives an unpleasant sense of touch to particular coating products. Since the disadvantages of grease adversely affect the ease in handling materials while work is performed, the disadvantages are recognized as important elements in the preparation process. Further, grease undergoes a change in viscosity at low temperature or high temperature. The change in viscosity affects performance during a rapid temperature range, thereby also affecting the stability of the coating.

Recently, a waterproofing dry coating has been devised so as to have a little absorptiveness. The absorptiveness of the coating prevents moisture from directly contacting a sensitive surface by allowing the coating to absorb moisture which is brought into contact with a product. An absorptive element of the moisture-blocking coatings is a particulate superabsorbent polymer which swells and absorbs water when it is brought into contact with water.

Meanwhile, a coating may be typically sprayed and applied onto the surface of a product, and a coating composition needs to be sufficiently thick in order to provide good protection force and form a coating layer which is thick enough to prevent moisture from penetrating the product. However, the composition needs to have a sufficient thickness and sufficient fluidity, and thus makes sure that a uniform coating is easily formed on the surface of a material and the passages of other machines used during the formation of a coating are not clogged.

Therefore, there is a continuous need for a coating composition which is applied to products used outdoors, such as air conditioning machines, that adsorbs moisture through chemical interactions, and exhibits not only excellent strength and a high absorbent property, but also good spreadability and surface performance characteristics.

DISCLOSURE OF THE INVENTION

Therefore, an object of the present invention is to provide a polymer-based superabsorbent coating composition comprising: (i) an absorbent material; and (ii) a binder comprising a polymerizable absorbent polymer and a crosslinking agent, in which the absorbent material is chemically bonded to the binder by having at least one functional group for being chemically bonded to the binder, and the polymerizable absorbent polymer and the crosslinking agent are chemically bonded to each other in the binder, and a coating method using the same, thereby achieving a coating technology including not only excellent durability and high absorbent property, but also good spreadability and surface performance characteristics.

To achieve these and other advantages and in accordance with the purpose of the present invention, as embodied and broadly described herein, there is provided a superabsorbent coating composition according to an example of the present invention comprising: (i) an absorbent material; and (ii) a binder comprising a polymerizable absorbent polymer and a crosslinking agent, in which the absorbent material is chemically bonded to the binder by having at least one functional group for being chemically bonded to the binder, and the polymerizable absorbent polymer and the crosslinking agent are chemically bonded to each other in the binder.

The coating composition may include the absorbent material, the polymerizable absorbent polymer, and the crosslinking agent in an amount of 10 wt % to 50 wt %, 10 wt % to 30 wt %, and 4 wt % to 10 wt %, respectively.

The absorbent material may be selected from the group consisting of a superabsorbent polymer (SAP), an absorbent polymer powder, a silica powder, and a combination thereof.

The absorbent material may be surface-modified so as to have at least one functional group for being chemically bonded to the binder.

The surface modification may be carried out by an aminosilane treatment.

The polymerizable absorbent polymer may be a carboxylic acid having at least one carboxyl group, the crosslinking agent may be a multifunctional alcohol, and the carboxylic acid and the multifunctional alcohol may be ester-bonded to each other in the binder.

The polymerizable absorbent polymer may be polyacrylic acid or polymethacrylic acid.

The crosslinking agent may be sorbitol ethoxylate or pentaerythritol ethoxylate.

The absorbent material and the binder may be amide-bonded to each other.

The coating composition may further include a thickener, a lubricant, an absorbent material, and a combination thereof.

In order to achieve the object, the coating method according to another example of the present invention comprises: (i) applying the superabsorbent coating composition of the present invention onto a substrate; and (ii) curing the composition applied onto the substrate to form a coating.

In the coating method, the curing may be a thermal curing performed at 130° C. to 200° C. for 10 minutes to 1 hour.

Hereinafter, the present invention will be described in more detail.

A superabsorbent coating composition of the present invention includes: (i) an absorbent material; and (ii) a binder comprising a polymerizable absorbent polymer and a crosslinking agent, in which the absorbent material is chemically bonded to the binder by having at least one functional group for being chemically bonded to the binder, and the polymerizable absorbent polymer and the crosslinking agent are chemically bonded to each other in the binder.

The present invention relates to an absorbent polymer-based coating composition, which is applied to an air conditioning machine, and the like, and thus adsorbs moisture through chemical interactions. An absorbent material such as a silica gel powder or a high absorbent polymer powder (superabsorbent polymer powder, SAP powder) does not have adhesive property itself, and thus requires a binder having adhesive property when coated onto another surface. The present invention induces a chemical bond between components constituting the binder and induces another chemical bond with the binder as a means for further reinforcing adhesive property for the absorbent material which does not have adhesive property itself, and as a result, the present invention is intended to improve durability through multiple chemical bonds in the coating composition. Further, the present invention provides a superabsorbent coating composition which may be intended to reinforce the adhesive property and durability and improve absorbent property even from a component constituting a binder by applying an absorbent polymer material as a component capable of forming a chemical bond, which is included in the binder.

In an exemplary embodiment, the absorbent material may be selected from the group consisting of a superabsorbent polymer (SAP), an absorbent polymer powder, a silica powder, and a combination thereof. However, the absorbent material used in the present invention may be used without limitation as long as the absorbent material is, for example, a moisture superabsorbent material having a performance required for absorbing and desorbing a large amount of water, and the absorbent material is not limited thereto.

In an exemplary embodiment, as an absorbent polymer included in a binder, it is possible to use a polymerizable material, preferably a polymer acid, and more preferably an acid which contains at least one carboxyl group, and thus may be chemically ester-bonded to an alcoholic crosslinking agent in the binder. At this time, a crosslinking agent included in a binder may form a chemical bond with the polymerizable absorbent polymer, and preferably, it is possible to apply a water-soluble multifunctional alcohol capable of forming an ester bond with a polymerizable absorbent polymer containing a carboxyl group. By using a (high) absorbent polymer as a binder component in a binder as described above and additionally including a crosslinking agent component capable of being chemically bonded to the polymer in the binder, the binder in the coating composition of the present invention may be an adhesive means and simultaneously may exhibit effects of helping a main absorbent material contribute to superabsorbent properties of a coating when a coating composition is finally cured, and thus forms the coating, and improving the durability resulting from a chemical bond formed in the binder. Accordingly, the coating composition of the present invention includes an absorbent material, a binder, and a solvent capable of blending the binder with the binder, a primary chemical bond is present in the binder, and a secondary chemical bond is formed between the binder and the main absorbent material as described below, so that when a substrate is finally coated with the coating composition, the durability is further improved.

In an exemplary embodiment, the polymerizable absorbent polymer as a component constituting a binder may be an addition polymerizable acid, for example, acrylic acid, methacrylic acid, ethacrylic acid, α-chloroacrylic acid, crotonic acid, maleic acid, maleic anhydride, vinyl sulfonic acid, vinyl phosphonic acid, maleic acid, maleic anhydride, fumaric acid, itaconic acid, citraconic acid, mesaconic acid, glutaconic acid, aconitic acid, allyl sulfonic acid, sulfoethyl acrylate, sulfoethyl methacrylate, sulfopropyl acrylate, sulfopropyl methacrylate, 2-hydroxy-3-cryloyloxy propyl sulfonic acid, 2-hydroxy-3-methacryloyloxy propyl sulfonic acid, allyl phosphonic acid, styrene sulfonic acid, 2-acrylamido-2-methylpropane sulfonic acid, and 2-acrylamido-2-methylpropane phosphonic acid.

In a certain exemplary embodiment, as a component constituting a binder, the polymerizable absorbent polymer may be a carboxylic acid having at least one carboxyl group, the crosslinking agent may be a multifunctional alcohol, and the carboxylic acid and the multifunctional alcohol may be ester-bonded to each other in the binder. In particular, the carboxylic acid may be selected from the group consisting of an absorbent material polyacrylic acid having performance required for absorbing and desorbing a large amount of water. Particularly preferably, the polymerizable absorbent polymer may be polyacrylic acid or polymethacrylic acid. These form a superabsorbent polymer material through a chemical reaction with a base, and have advantages in that these may constitute a surface coating having better mechanical characteristics during a formation of an ester bond with a crosslinking agent than organic single molecule-based acids, and are not harmful for the human body. In particular, polyacrylic acid is a superabsorbent polymer, which is even used in a diaper, that is not harmful for the human body, can be easily available, and has advantages in that polyacrylic acid can be used under neutral pH conditions. Also, polyacrylic acid is easily polymerized due to the low polymerization temperature, and can be crosslinked at low temperature when a coating film is formed by using the polymer. The carboxylic acid may be used in the form of an anion such as a salt of a corresponding alkali or alkali metal, if necessary.

In a certain exemplary embodiment, a binder may include an additional component, and these additional components may be any polymeric material typically used as a binder of a coating composition. For example, it is possible to increase the flexibility of a final coating by including a polymer for forming a film, or a polymer latex, which is a thermosetting resin or a thermosetting resin having a slight thermoplasticity. Further, once applied, the polymer for forming a film may promote a bond between components in the coating composition and simultaneously may promote adhesive property on the surface thereof. In addition, a film-forming agent does not cause any surface stickiness to a rough film or any fracture of a coating, even after the film is cured, and may be, for example, polyester, urethane, epoxy, latex, or a mixture thereof. The latex may be selected from an acrylic latex, a styrene-butadiene latex, or a mixture thereof. It is preferred that epoxy or urethane is included in terms of a function which promotes adhesion of an absorbent material on a coating-treated surface after the film is dried.

In a certain exemplary embodiment, the crosslinking agent as a component constituting a binder may be a multifunctional alcohol capable of forming an ester bond with a polymerizable absorbent polymer. The multifunctional alcohol may be used without limitation as long as the multifunctional alcohol is an alcohol having two or more hydroxyl groups in the molecule thereof, and examples thereof include glycerol, 1,2,4-butanetriol, 2-(hydroxymethyl)-1,3-propanediol, hexanetriol, trimethylolpropane, trimethylolethane, trimethylolhexane, 1,4-cyclohexanetrimethanol, propylene glycol, butylene glycol, diethylene glycol, polyethylene glycol, polypropylene glycol, a copolymer of polyethylene glycol and polypropylene glycol, xylitol, sorbitol, mannitol, pentaerythritol, dipentaerythritol, and an alkoxylated derivative thereof, but are not limited thereto. Preferably, the multifunctional alcohol may be sorbitol, sorbitol ethoxylate, pentaerythritol, or pentaerythritol ethoxylate. In particular, sorbitol ethoxylate and pentaerythritol ethoxylate are a hexafunctional alcohol material and a tetrafunctional alcohol material, respectively, and when a coating is formed by forming an appropriate crosslink with a binder polymer using sorbitol ethoxylate and pentaerythritol ethoxylate as a crosslinking agent, the crosslinking proceeds while a polymerizable absorbent polymer and a crosslinking agent each have an appropriate crosslinking density, so that an absorbent material may be bound proficiently. As a result, it is possible to prevent the coating from being separated from the substrate. Furthermore, ethoxylate of the multifunctional alcohol maintains fluidity even at low temperature, and thus also has an advantage in that a polymer coating to be formed secures flexibility even at low temperature, and thus may suppress a degradation phenomenon.

In an exemplary embodiment, the absorbent material may be surface-modified so as to include at least one functional group for being chemically bonded to the binder. As described above, the present invention is designed so as to form a double chemical bond in a coating in order to improve durability of the coating which is finally applied and formed on a substrate. A primary chemical bond may be formed inside the binder, but for a coating in which the coating composition of the present invention is finally implemented by forming an additional chemical bond between a binder and an absorbent material, the resistance to physical friction or external stimuli, that is, the durability may be significantly improved. The chemical bond between the binder and the absorbent material may be used without limitation as long as the chemical bond is formed by a covalent bond, but particularly preferably, the surface modification forms an amine group on the surface of the absorbent material by subjecting the surface of the absorbent material to an aminosilane treatment, and accordingly, the absorbent material and the binder may be amide-bonded to each other. For example, a silica powder as an absorbent material can form a stronger binding than a binder by being subjected to a silane treatment using aminosilanes to introduce an amine group into the surface.

As described above, the coating composition of the present invention may have excellent durability, first of all, in a coating formed by curing the coating composition on a substrate through a double chemical bond. The durability can be seen as a result of a crosslink increased through a double chemical bond. Further, in addition to a main absorbent material having superabsorbent properties, the coating composition of the present invention provides the waterproof property thereof by absorbing a significantly large amount of water also from using a water-absorbing polymer as a component contained in a binder. When water is brought into contact with a coated surface of a product to be protected, the coating will be three-dimensionally swollen by absorbing water. The coating prevents the internal surface of the protected product and water from being brought into contact with each other by absorbing water to effectively adsorb moisture, and as a result, the sensitive internal surface is maintained in a dry state, and thus will be protected from damage caused by flood. Accordingly, in a product in which the coating composition provided by the present invention is applied to form a coating, the coating will serve a waterproof protective function by absorbing water to prevent moisture from penetrating the side just below the coating layer. A coating formed from the coating composition of the present invention exhibits an absorbent performance improved by about 1.5 times to 2 times as compared to commercially available coatings in the related art (see Test Example 1 and FIG. 3).

The coating composition of the present invention is mixed in a solvent which is compatible with absorbent material and binder components, and examples of the solvent include ethanol, isopropanol, butanol, propylene glycol, and the like, but are not limited thereto.

In an exemplary embodiment, the coating composition of the present invention may be applied onto a pultrusion molded or injection molded material, such as a product containing glass, a polymer, carbon or a reinforced fiber. Such a product includes a pultrusion molded product, such as a reinforced fiber, a strand, a rod, a roving, and the like in a continuous form or in a form of a chopped fiber, a strand or a pellet; a fabric composed of glass, a polymer, or a natural fiber; and a rod or a cable. The composition of the present invention is suitable for forming a superabsorbent coating on the surface of a fiber-reinforced material, or a fiber product or a product prepared by using the reinforced material. A material onto which a composition may be applied may be largely classified into a fiber reinforced material such as a continuous phase strand, or a complex material product including a fiber reinforced material and at least one other component. A component included in the preparation of a superabsorbent coating composition may vary depending on the form of a product onto which a composition is applied. Examples of the fiber reinforced material include a strand or roving prepared from a fiber-forming material such as glass, carbon, a polymer, or a mixture thereof. Another complex material product may include a product including a reinforced fiber material as at least one component. For example, a product prepared by pultrusion molding, for example, the coating composition of the present invention may be successfully applied onto a pultrusion molded rod or cable including at least a portion of a reinforced glass fiber/polymer complex material. A polymer which may be used to prepare the pultrusion molded product may include a thermosetting resin such as epoxide, polyester, and vinyl ester. In addition, a polymer component of a pultrusion molded product may also be a heat-treated thermoplastic resin, but is preferably a thermosetting resin. As an example, a thermosetting epoxy resin such as vinyl ester may also form a rod which is combined with glass strands by a pultrusion molding action, and thus may be used as a cured member of a telecommunication cable.

In a certain exemplary embodiment, the coating composition of the present invention may include the absorbent material, the polymerizable absorbent polymer, and the crosslinking agent in an amount of 10 wt % to 50 wt %, 10 wt % to 30 wt %, and 4 wt % to 10 wt %, respectively. When a main absorbent material component and a binder component comprising a polymerizable absorbent polymer and a crosslinking agent at the aforementioned ratio are mixed, it is possible to have an optimal absorbent ability targeted by the present invention and simultaneously achieve a coating having excellent durability.

The main absorbent material may be included in an amount of preferably 10 wt % to 50 wt %, more preferably 20 wt % to 30 wt %, and most preferably about 25 wt % in the coating composition of the present invention. When the absorbent material exceeds an amount of more than 50 wt %, it is difficult to make a strong coating by allowing the absorbent material to be bonded to a binder due to too large a volume, thereby reducing the durability of the coating. When the absorbent material is less than an amount of less than 10 wt %, the ratio of the absorbent material to be introduced is reduced, and as a result, the absorbent performance may deteriorate.

The polymerizable absorbent polymer may be included in an amount of preferably 10 wt % to 30 wt %, more preferably 15 wt % to 25 wt %, and most preferably about 20 wt % in the coating composition in an embodiment of the present invention. When the polymerizable absorbent polymer exceeds an amount of more than 30 wt %, an extremely thick coating film is formed, and the absorbent ability of the absorbent material may rather deteriorate. The polymerizable absorbent polymer lower than an amount of less than 10 wt % is insufficient for sufficiently binding the absorbent material, and thus may cause a problem with the durability of a coating film.

Furthermore, the crosslinking agent may be included in an amount of preferably 4 wt % to 10 wt %, more preferably 5 wt % to 8 wt %, and most preferably about 6 wt %. When the crosslinking agent is added in an amount of less than 4 wt %, the binding to the absorbent material is so weak due to the low crosslinking density that separation from the coating film may occur, and when the crosslinking agent is added in an amount of more than 10 wt %, a partial crosslinking occurs in a coating liquid, or the viscosity of the coating liquid is so high that it may be difficult to perform the coating.

In an exemplary embodiment, when a material insoluble in a solvent is used as an absorbent material included in the coating composition of the present invention, the surface area may be maximized by artificially increasing the roughness of the surface of a finally applied coating, and the absorbent rate and efficiency may be improved through the maximization of the surface area. The combination use of such a solutionized binder and an insoluble main absorbent material may bring effects of maximizing the coating surface area and improving the absorbent efficiency through a physical method.

In an exemplary embodiment, the coating composition may further include a thickener, a lubricant, an additional absorbent material, and a combination thereof as an additive. Depending on what is finally intended through the coating, it may strengthen the durability of a final coating and/or impart spreadability to add a thickener to a coating composition. When a lubricant is added, the adhesive property of the coatings on a material such as a substrate to be coated may be improved, thereby facilitating handling in a subsequent process. When an absorbent material is also added, it is possible to promote the contact between the coating composition and the surface of a substrate material to be an object of the coating. The thickener, the lubricant, and the absorbent material may be used without limitation as long as they are compatible with other components included in the coating composition of the present invention.

In order to achieve the object, the coating method according to another example of the present invention includes: (i) applying the superabsorbent coating composition of the present invention onto a substrate; and (ii) forming a coating by curing the composition applied onto the substrate. The coating composition is brought into contact with the surface of a substrate material, and thus coated by a method suitable for being applied. For example, the coating composition may be applied by allowing a reinforced fiber strand to pass through a bath containing a resin. Otherwise, the composition may be applied onto a product by spray, immersion, or other methods which bring liquid coatings into contact with the entire surface of the product. And then, for a uniform and appropriate distribution of a coating layer, an additional process means may also be used. Thereafter, the coated product may be dried and cured.

In the coating method, the drying and curing step may be carried out by any drying/curing method typically used in the art to which the coating composition of the present invention pertains, and the curing may be preferably a thermal curing performed at 130° C. to 200° C. for 10 minutes to 1 hour.

The thermal curing may be performed at 130° C. to 200° C., more preferably 170° C. to 190° C., and most preferably 190° C.±5° C. Since the crosslinking of the polymerizable absorbent polymer and the crosslinking agent is performed at 130° C. or more, and a phenomenon in which the absorbent material or the polymer binder is burnt may occur at a high temperature of more than 200° C., the thermal curing is performed in a range from 130° C. to 200° C. That is, the temperature may be in an optimal temperature range at which a sufficient curing is performed and the thermal degradation of the material does not occur.

The thermal curing may be performed for 10 minutes to 1 hour, more preferably 20 minutes to 40 minutes, and most preferably about 30 minutes. When the thermal curing time is less than 10 minutes, which is too short, the crosslinking reaction does not completely proceed, so that separation of the coating film is highly likely to occur, and in contrast, when the thermal curing time is 1 hour or more, which is long, there may occur a phenomenon in which the coating film is split or becomes crumbly due to the excessive drying of the coating film, and discoloration may occur due to a burning phenomenon.

For the coating composition of the present invention, a coating formed by applying the composition protects a treated surface from permeation of moisture by effectively absorbing water which is brought into contact with the coating. Further, the coating composition of the present invention exhibits high absorbent property and simultaneously excellent strength and good spreadability and surface performance characteristics.

BRIEF DESCRIPTION OF THE DRAWINGS

FIG. 1 is an exemplary schematic view of the constitution of the superabsorbent coating composition of the present disclosure.

FIG. 2 is an electronic microscope photograph of the coating composition of the present disclosure, which uses a silica powder as an absorbent material.

FIG. 3 shows a result of measuring an absorption amount of a coating obtained by curing the superabsorbent coating composition of the present disclosure of Test Example 1.

FIG. 4 shows a result of measuring an adhesion strength of a coating obtained by curing the superabsorbent coating closure of the present invention of Test Example 2.

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

Hereinafter, the examples of the present invention will be described in detail with reference to accompanying drawings, such that those skilled in the art to which the present invention pertains can easily carry out the present invention. However, the present invention can be implemented in various different forms, and is not limited to the examples described herein.

EXAMPLE 1

Preparation of Superabsorbent Coating Composition and Coating Thereof on Substrate (1) 0.2 kg of acrylic acid (anhydrous 99%, Sigma Aldrich) and 2 g of azobisisobutyronitrile (AIBN, polymerization initiator) (98.0%, JUNSEI) were dissolved in 0.8 kg of ethanol (99.9%, Daejung Chemical & Metals Co., Ltd.). Nitrogen was bubbled for 30 minutes or more, and then the temperature was increased to 70° C. and maintained for 8 to 12 hours. Thereafter, 0.2 kg of ethanol and 60 g of sorbitol ethoxylate (trade name SINOPOL TL-034, SINO-JAPAN Chemical) were additionally added to the polymer solution which had been completely recovered, thereby obtaining a polymer binder solution.

(2) 100 g of silica (Fuji Silysia) was added to 1 L of toluene (99.5%, Samchun Pure Chemical Co., Ltd.), and 5 g of aminosilane (trade name OFS-6020, Dow-Corning) was added thereto under stirring. The resulting mixture was stirred for 30 minutes, and then left to stand for 12 hours to complete the chemical reaction. The obtained silica powder was filtered and then dried.

0.48 kg of the silica powder was mixed with the prepared polymer binder solution under stirring, thereby preparing a coating composition.

The prepared coating composition was applied onto a corrosion-resistant aluminum substrate, and then the aluminum substrate was heated at 170° C. to 190° C. for 30 minutes to complete the curing reaction.

TEST EXAMPLE 1

Measurement of Absorption Amount of Coating Obtained by Curing Superabsorbent Coating Composition of Example 1

The coated substrate prepared in Example 1 was dried in an oven set at 120° C. for 30 minutes, and then the weight was measured, the coated substrate of which the weight was measured was placed in a constant temperature and humidity chamber (model name PR-2KPH, ESPEC Corporation) conditioned to the temperature and humidity (temperature: 25° C., relative humidity: 40%/60%/80%), and the weight was measured by taking out the substrate over time. The absorption amount (adsorption amount) of the coating was measured by comparing the initial weight measured before the substrate was placed in the constant temperature and humidity chamber with the weight of the substrate over time. The results are illustrated in FIG. 3.

TEST EXAMPLE 2

Measurement of Adhesion Strength of Coating Obtained by Curing Superabsorbent Coating Composition of Example 1

(Cross Cut Test)

On a coating film surface of a test specimen of the coated substrate prepared in Example 1, 100 notches were formed with a knife lengthwise and crosswise at an interval of 1 mm, and then a cellophane adhesive tape (width 24 mm) was strongly attached thereto in a state where a fat removal (TCE, trichloroethane) work was performed, and then the swelling and softening of the coated film and the attachment state of the notches were confirmed when the cellophane adhesive tape was pulled upward. The results are illustrated in FIG. 4.

Although preferred examples of the present invention have been described in detail hereinabove, the right scope of the present invention is not limited thereto, and it should be clearly understood that many variations and modifications of those skilled in the art using the basic concept of the present invention, which is defined in the following claims, will also fall within the right scope of the present invention.

The invention claimed is:

1. A superabsorbent coating composition comprising:
an absorbent material; and
a binder comprising a polymerizable absorbent polymer and a crosslinking agent,
wherein the absorbent material has at least one functional group that is chemically bonded to the binder,
wherein the polymerizable absorbent polymer and the crosslinking agent are chemically bonded to each other in the binder,
wherein the absorbent material is selected from the group consisting of a superabsorbent polymer (SAP), an absorbent polymer powder, a silica powder, and a combination thereof, wherein the polymerizable absorbent polymer is a carboxylic acid having at least one carboxyl group,
wherein the crosslinking agent is a multifunctional alcohol, and
wherein the carboxylic acid and the multifunctional alcohol are ester-bonded to each other in the binder.

2. The superabsorbent coating composition of claim 1, comprising:
based on a weight of superabsorbent coating composition,
the absorbent material in an amount of 10 wt% to 50 wt%;
the polymerizable absorbent polymer in an amount of 10 wt% to 30 wt%; and
the crosslinking agent in an amount of 4 wt% to 10 wt%.

3. The superabsorbent coating composition of claim 2, wherein the absorbent material is in an amount of 10 wt% to 30 wt%.

4. The superabsorbent coating composition of claim 2, wherein the absorbent material is in an amount of 20 wt% to 30 wt%.

5. The superabsorbent coating composition of claim 1, wherein the absorbent material is surface-modified so as to have at least one functional group to chemically bond to the binder.

6. The superabsorbent coating composition of claim 5, wherein the absorbent material is surface-modified by an aminosilane treatment.

7. The superabsorbent coating composition of claim 1, wherein the multifunctional alcohol is an alcohol having two or more hydroxyl groups in the molecule thereof.

8. The superabsorbent coating composition of claim 7, wherein the multifunctional alcohol is selected from the group consisting of glycerol, 1,2,4-butanetriol, 2-(hydroxymethyl)-1,3-propanediol, hexanetriol, trimethylolpropane, trimethylolethane, trimethylolhexane, 1,4-cyclohexanetrimethanol, propylene glycol, butylene glycol, diethylene glycol, polyethylene glycol, polypropylene glycol, a copolymer of polyethylene glycol and polypropylene glycol, xylitol, sorbitol, mannitol, pentaerythritol, dipentaerythritol, and an alkoxylated derivative thereof.

9. The superabsorbent coating composition of claim 7, wherein the multifunctional alcohol is selected from the group consisting of sorbitol, sorbitol ethoxylate, pentaerythritol, and pentaerythritol ethoxylate.

10. The superabsorbent coating composition of claim 1, wherein the polymerizable absorbent polymer is polyacrylic acid or polymethacrylic acid.

11. The superabsorbent coating composition of claim 1, wherein the crosslinking agent is sorbitol ethoxylate or pentaerythritol ethoxylate.

12. The superabsorbent coating composition of claim 1, wherein the absorbent material and the binder are amide-bonded to each other.

13. The superabsorbent coating composition of claim 1, further comprising a thickener, a lubricant, an absorbent, or a combination thereof.

* * * * *